UNITED STATES PATENT OFFICE.

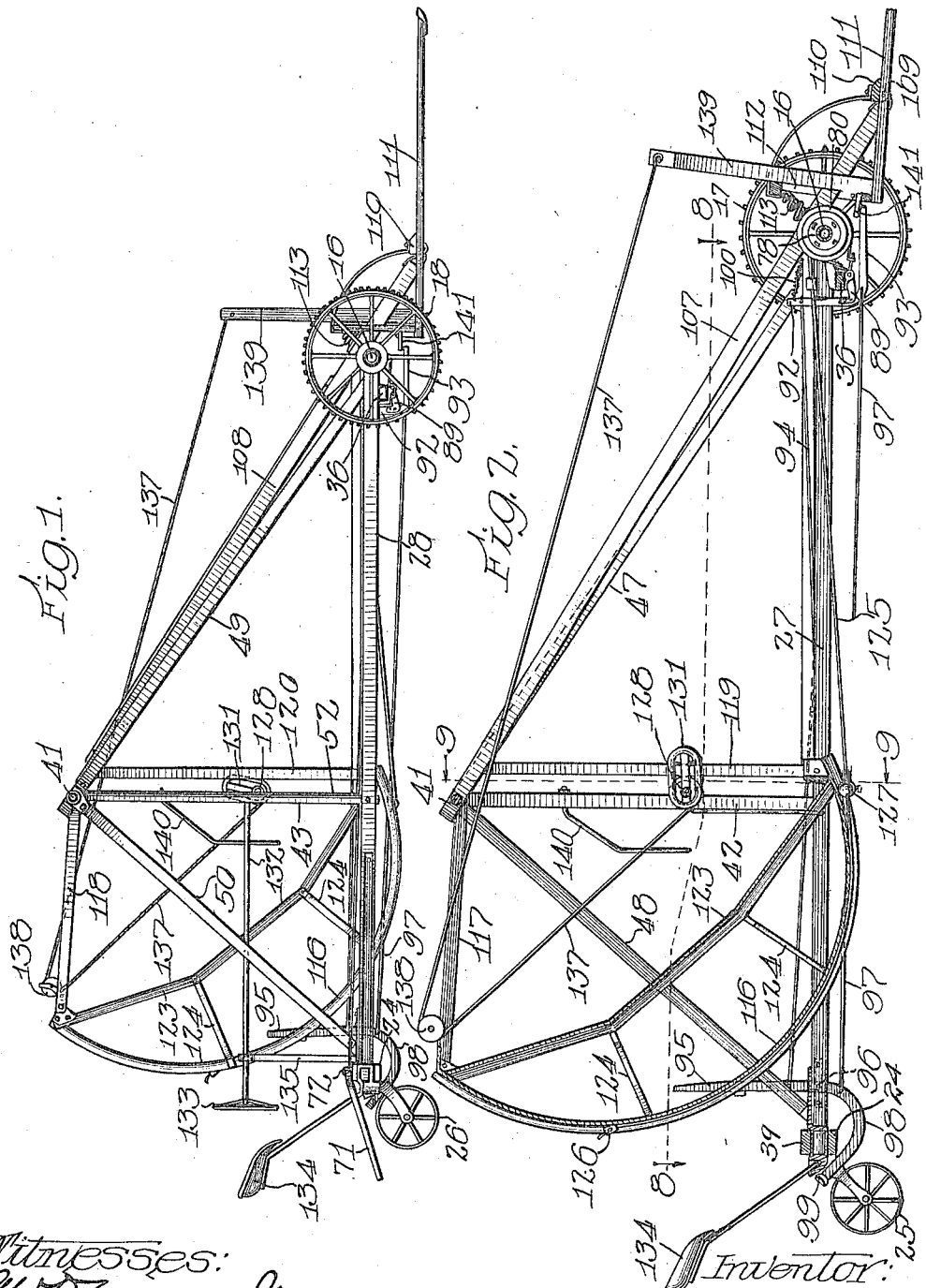

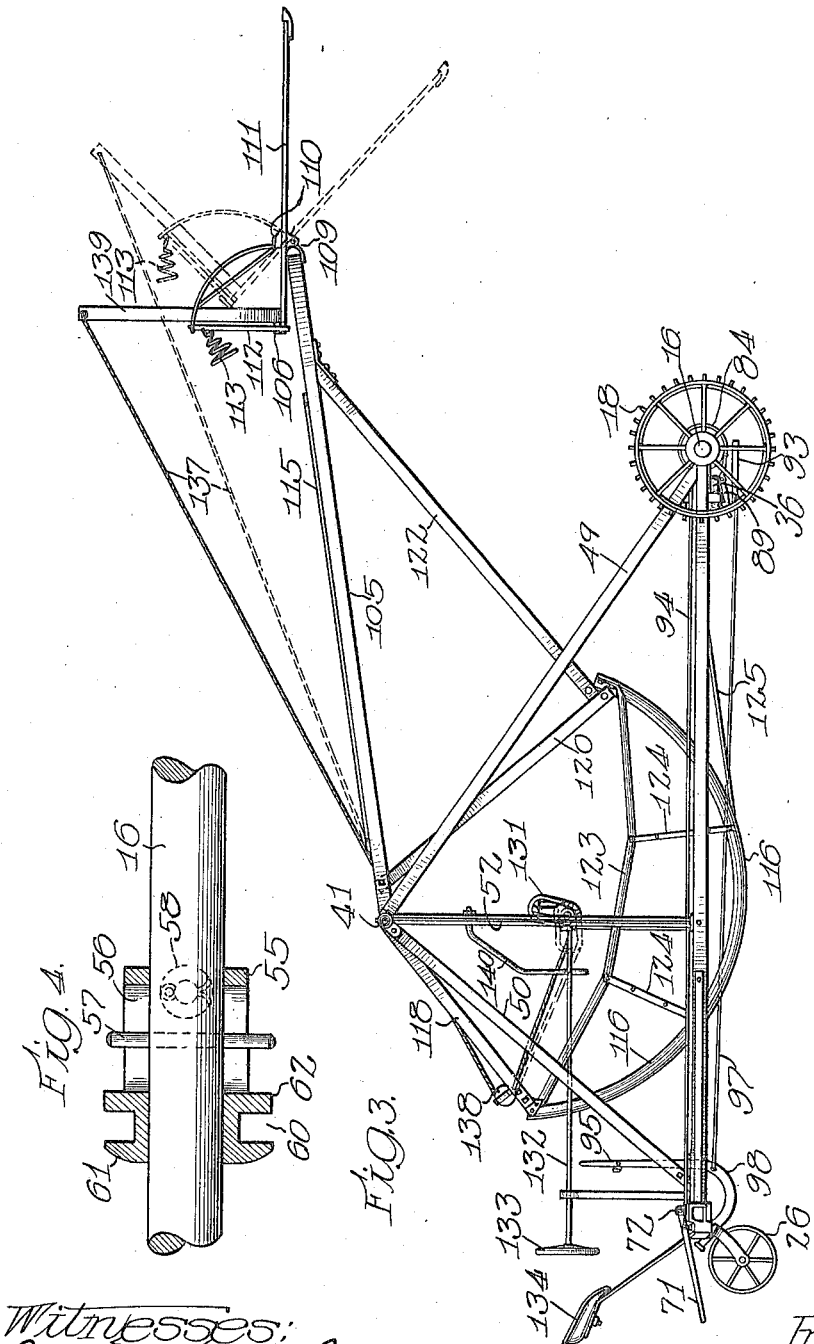

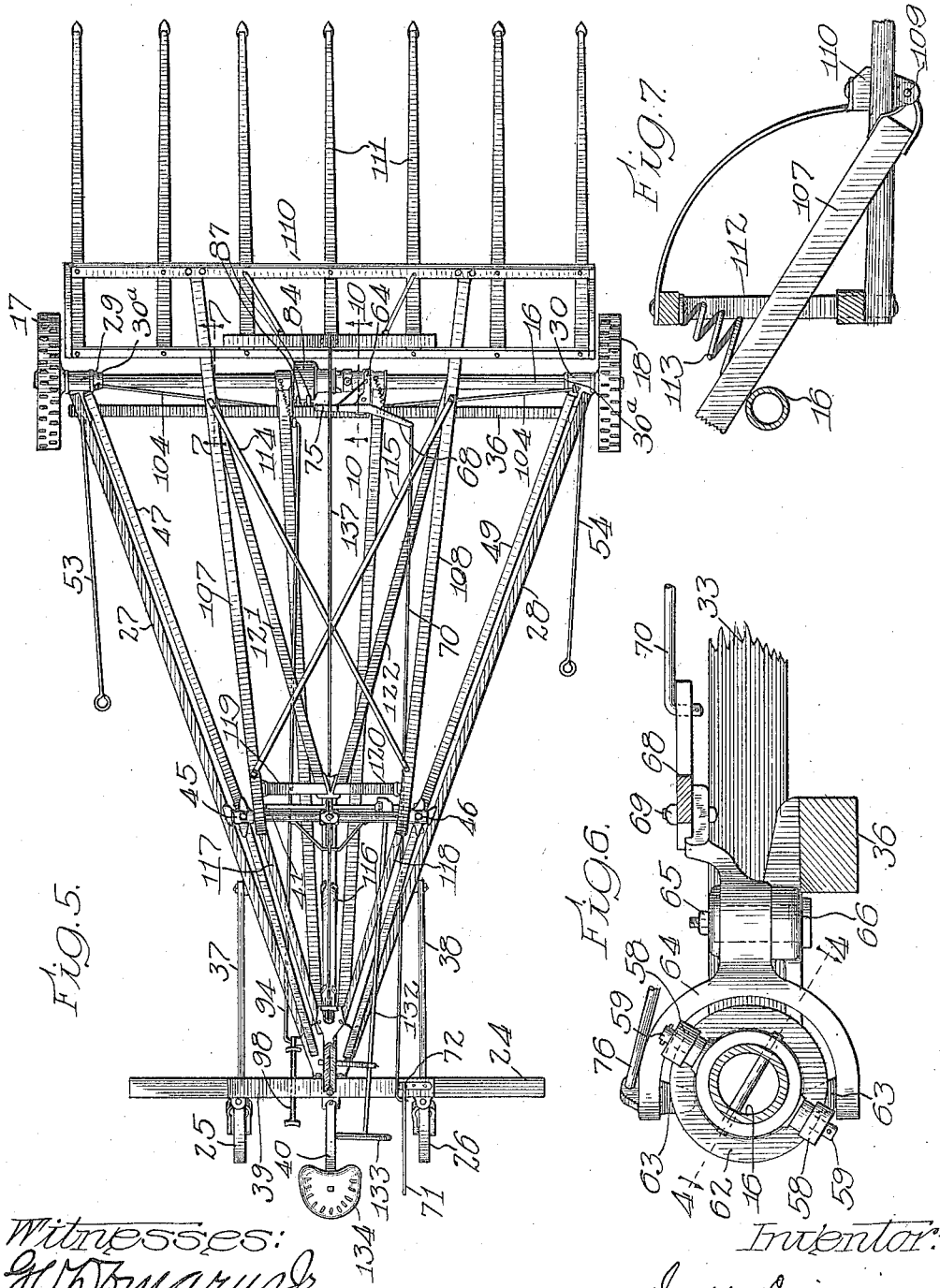

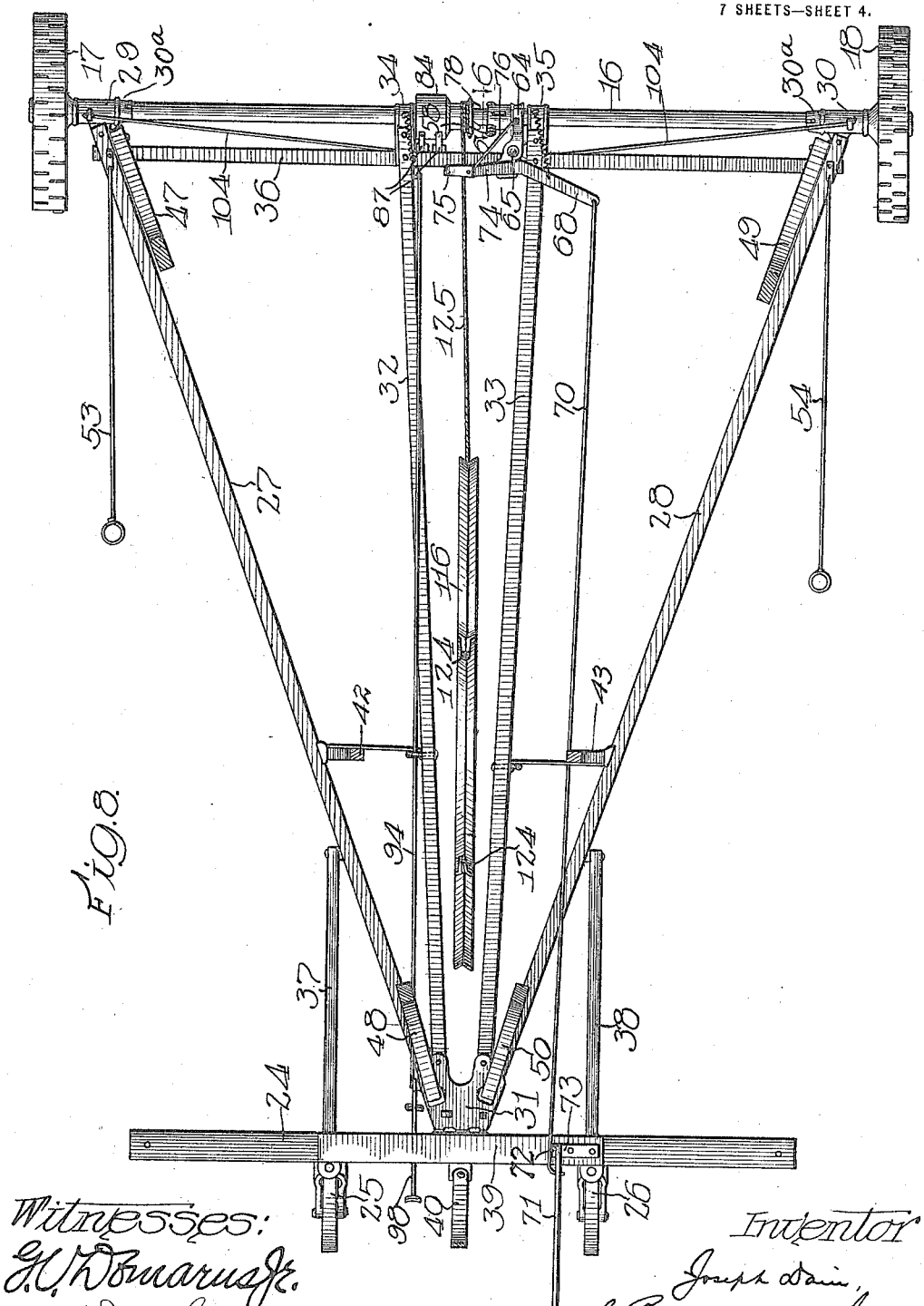

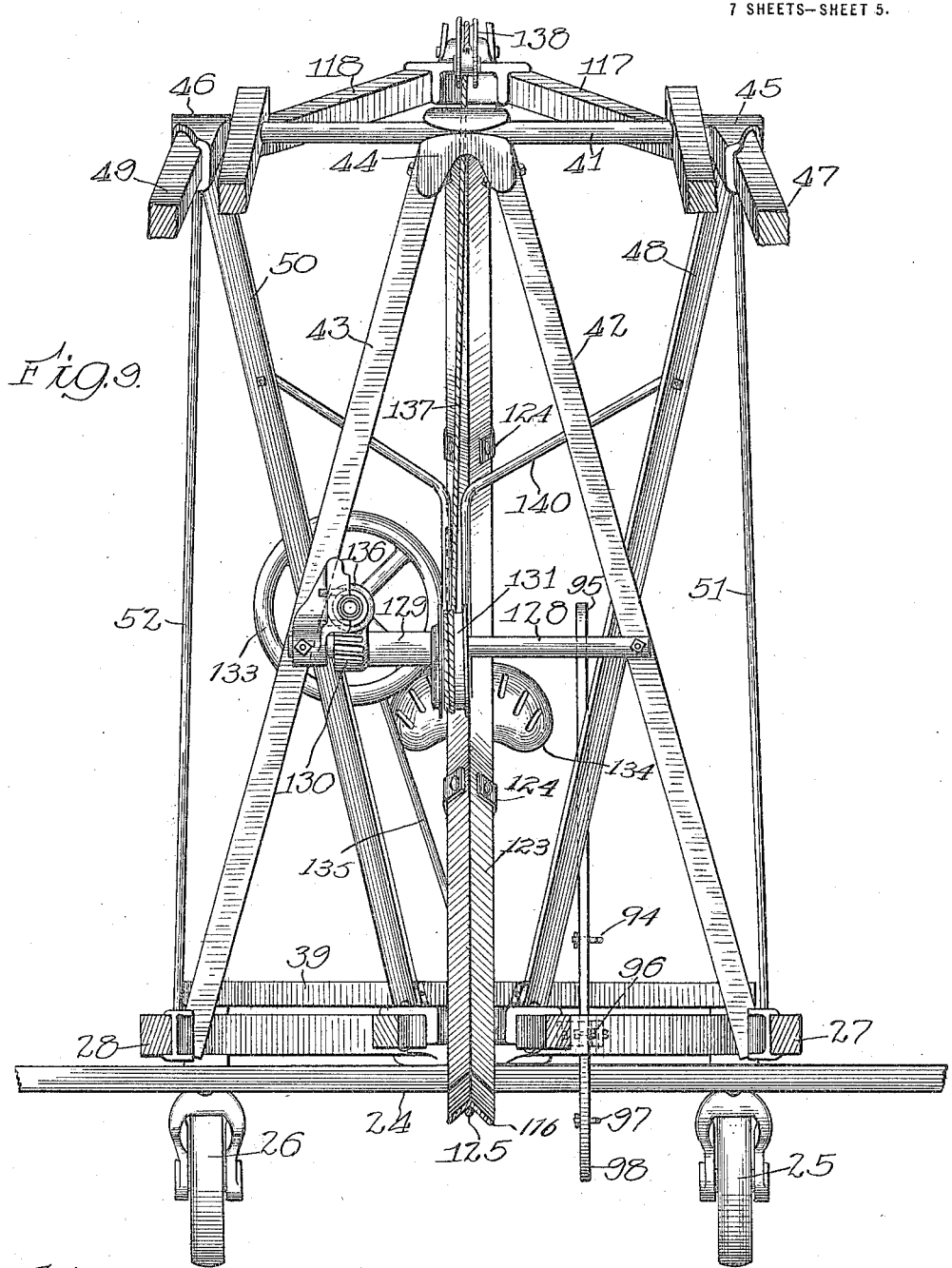

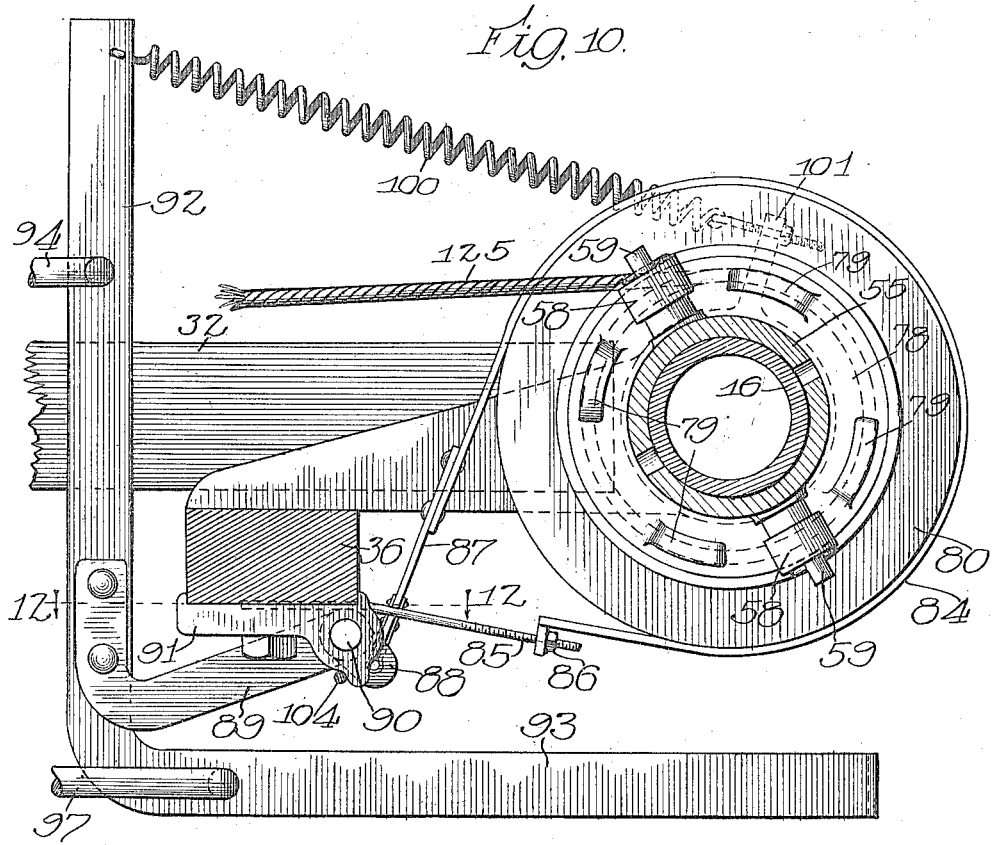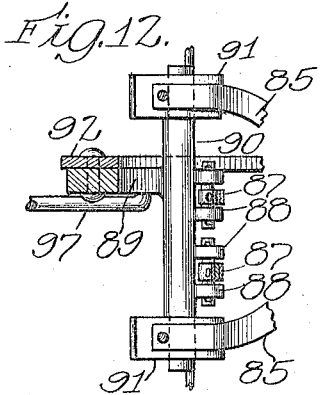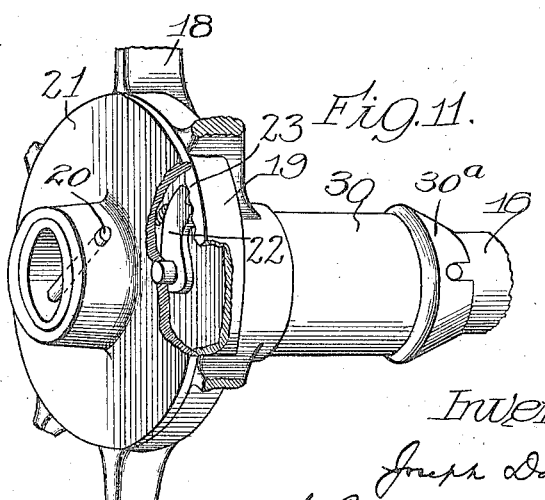

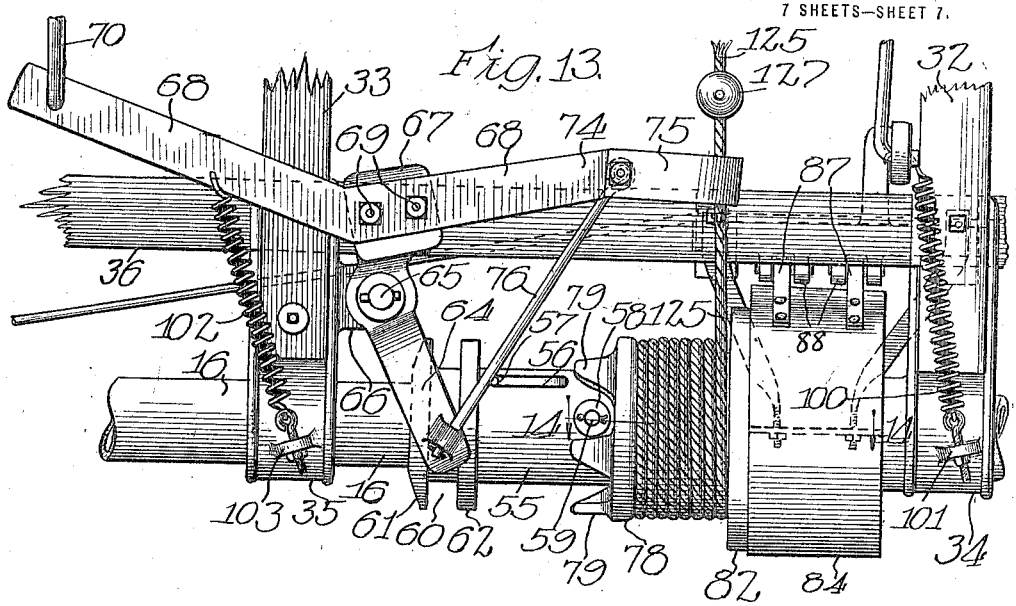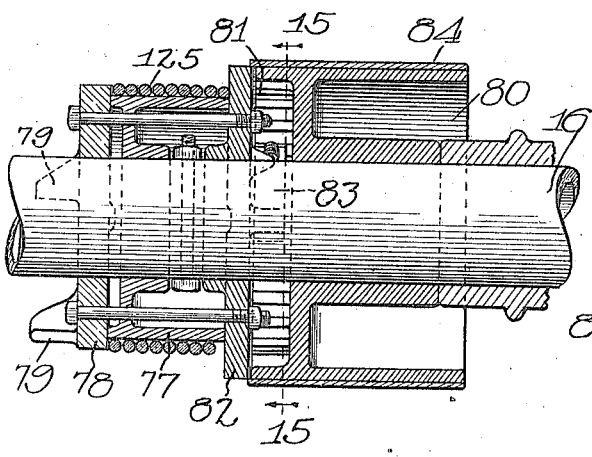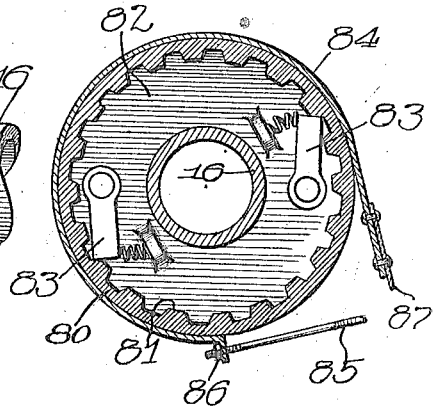

JOSEPH DAIN, OF OTTUMWA, IOWA, ASSIGNOR TO DAIN MANUFACTURING COMPANY, OF OTTUMWA, IOWA, A CORPORATION OF IOWA.

COMBINED HAY STACKER AND RAKE.

1,180,700.

Specification of Letters Patent.

Patented Apr. 25, 1916.

Application filed April 17, 1912. Serial No. 691,263.

*To all whom it may concern:*

Be it known that I, JOSEPH DAIN, a citizen of the United States, residing at Ottumwa, in the county of Wapello and State of Iowa, have invented certain new and useful Improvements in Combined Hay Stackers and Rakes, of which the following is a specification, reference being had to the accompanying drawings.

My invention relates to hay machinery, and has for its objects to provide a haystacker which may be employed to transport the hay, as well as to lift it and deposit it on the stack, and also to provide a stacker which may itself serve as a rake to take up the hay from the ground, thereby dispensing with the rake necessarily employed where stationary stackers are used to elevate the hay and throw it onto the stack. I accomplish these objects as illustrated in the drawings and as hereinafter described.

What I regard as new is set forth in the claims.

In the accompanying drawings,—Figure 1 is a side view of my improved stacker; Fig. 2 is a substantially central longitudinal vertical section, slightly enlarged; Fig. 3 is a side view showing the carrier-head elevated; Fig. 4 is an enlarged detail, being a partial section on line 4—4 of Fig. 6; Fig. 5 is a plan view; Fig. 6 is an enlarged detail, being a cross-section on line 6—6 of Fig. 8; Fig. 7 is also an enlarged detail, being a cross-section on line 7—7 of Fig. 5; Fog. 8 is substantially a horizontal section on line 8—8 of Fig. 2; Fig. 9 is a vertical cross-section on line 9—9 of Fig. 2; Fig. 10 is a vertical section on line 10—10 of Fig. 5; Fig. 11 is a perspective view of one of the wheel-hubs, partly broken away; Fig. 12 is a horizontal section on line 12—12 of Fig. 10; Fig. 13 is an enlarged detail, being a plan view showing the mechanism for raising and lowering the carrier-frame; Fig. 14 is a vertical section on line 14—14 of Fig. 13; and Fig. 15 is a vertical cross-section on line 15—15 of Fig. 14.

My improved stacker comprises a wheel-supported frame or carriage, upon which is mounted a carrier or elevator frame having at one end portion thereof a rake-head adapted to receive the hay, the arrangement being such that when the rake-head is in its normal or raking position it projects in front of the carriage in such manner as to take up hay from the ground as the machine progresses. The carrier-frame is pivotally mounted so that by rocking it the rake-head may be raised to such a height that the hay carried by it may enable it to be deposited upon the stack. Mechanism is provided for actuating the elevator-frame by the forward movement of the carriage so that the draft of the team may be employed to lift the hay. Such mechanism is arranged also to permit the machine to be backed without affecting the position of the elevator-frame, and for disconnecting the lifting mechanism so that the machine may be moved forward without affecting the position of the elevator-frame. The rake-head is also so constructed as to be capable of tilting to discharge its load, and mechanism is provided so that the driver may control the tilting of the rake-head. In order to avoid danger of breaking the machine, I also provide for automatically disconnecting the elevator-frame from the mechanism for raising the same when the elevator-frame reaches a certain height.

I shall now describe more particularly the embodiment of my invention illustrated in the accompanying drawings,—it being understood that my invention is not restricted to the specific construction therein shown, except in so far as such construction is particularly claimed.

Referring to the drawings,—16 indicates an axle, which forms the front portion of the carriage and is provided with wheels 17—18 having a ratchet connection therewith, as shown in Fig. 11. In the construction shown, the wheels are provided with hubs 19 loosely fitted on the axle 16.

21 indicates disks secured to the end portions of the axle 16 by pins 20, and fitting against the outer faces of the hubs 19. Each disk 21 is provided with a pawl 22 which engages an internal annular ratchet 23 carried by the hub 19, as shown in Fig. 11. By this construction, the rotation of the wheels 17—18 in a forward direction will cause the axle 16 to rotate, but they may rotate freely in the reverse direction without actuating the axle 16.

24 indicates a rear beam or bar, which is arranged parallel with the axle 16 and serves not only as the rear member of the carriage but also as a means of attachment for the draft devices, which are preferably secured to the end portions thereof. The beam 24 is supported by caster-wheels 25—26 at opposite sides of the center thereof, as shown in Figs. 8 and 9.

27—28 indicate diverging side bars, the front end portions of which are connected with the end portions of the axle 16 by sleeves 29—30 which fit upon the axle adjacent to the hubs 19, and are held in place by collars 30ª, the rear ends of said side bars converging and being connected to a bracket 31 which is swiveled at the rear of the machine, centrally thereof, as shown in Fig. 8.

32—33 indicate intermediate bracing bars, the front end portions of which are connected loosely with the axle 16 by sleeves 34—35, their rear ends being connected with the bracket 31, as also shown in Fig. 8.

36 indicates a front brace extending across the machine adjacent to and parallel with the axle 16 and connecting the several bars 27—32 and 33—28.

37—38 indicate braces connecting the side bars 27—28, respectively, with the rear beam 24.

39 indicates a bar extending over the rear or draft beam 24 and loosely connected to the upper sides of the braces 37—38. The bracket 31 is swiveled between the bars 24 and 39, as shown in Figs. 2 and 8, to facilitate independent oscillation of the front and rear wheels, and thereby prevent warping or twisting strains on the machine when passing over uneven ground.

40 indicates a seat support.

41 indicates a transverse shaft mounted a considerable distance above the level of the side bars 27—28 near the rear portion of the carriage, as shown in Fig. 1, said shaft serving as a pivot about which the elevator-frame swings, as will be hereinafter described. The shaft 41 is supported intermediately by upright beams 42—43, the upper ends of which converge and are connected to a block or bracket 44, while their diverging lower ends are connected to the side bars 27—28, as shown in Fig. 9. The end portions of the shaft 41 are fitted in brackets 45—46 carried by front and rear inclined supports 47—48 and 49—50, as shown in Figs. 1 and 2, 47—48 indicating the pair of supports at the left-hand side of the machine and 49—50 a similar pair at the right-hand side of the machine. As best shown in Fig. 8, the supports 47—49 extend forward and are connected with the forward end portions of the side-bars 27—28, respectively, and the braces 48—50 extend rearwardly and connect with the bracket 31.

51—52 indicate tension rods, which, at their upper ends, are secured to the brackets 45—46 and at their lower ends are connected with the side-bars 27—28, thus maintaining the proper tension upon each pair of bars 47—48 and 49—50 and forming trusses which assist the beams 42—43 in supporting the shaft 41 and the load sustained thereby.

53—54 indicate rods or links which serve as the front hitch connections for the team, said rods being pivotally connected with the side frames 27—28, as shown in Fig. 8.

55 indicates a sleeve, which is mounted upon the axle 16, near the center thereof, and is free to slide to a limited extent longitudinally thereof. Said sleeve, however, is connected with the axle so as to rotate therewith, this being accomplished by providing said sleeve with slots 56 and passing a pin 57 through the axle 16 and through said slots, as best shown in Fig. 4. The sleeve 55 is provided near one end with one or more, preferably two, rollers 58 carried by radial pins 59, as best shown in Fig. 10, said rollers forming one member of a clutch by which the shaft 16 is connected with the elevator-frame, as will be hereinafter described. The sleeve 55 is also provided with an annular groove 60, preferably formed by collars 61—62, as best shown in Fig. 13. Said groove is designed to receive fingers 63 carried in the arms of a bifurcated lever 64 which is pivoted at 65 to a bracket 66 secured to the intermediate bar 33, as best shown in Fig. 13. The arrangement is such that by rocking the lever 64 about its fulcrum the sleeve 55 may be moved longitudinally upon the axle 16 without interfering with the rotary movement of the sleeve and axle. The lever 64 is fulcrumed intermediately, as shown in Fig. 13, its rear arm 67 being connected with a transverse lever 68 which is fixedly secured thereto, as by bolts 69. One arm of the lever 68 is connected by a connecting-rod 70 with a hand-lever 71 mounted at the rear of the machine on a pivot 72, as best shown in Fig. 1. The pivot 72 is carried by a bracket 73 secured to the bar 39, as shown in Fig. 8. The arrangement is such that by swinging the lever 71 forward the lever 68 may be rocked to move the sleeve 55 on the axle 16 to the position shown in Fig. 13. By moving the lever 71 to the rear, the lever 68 is operated to move the sleeve in the opposite direction on the axle, and by carrying the lever 71 far enough back the point of connection between the lever 71 and the connecting-rod 70 may be moved below the pivot 72, as shown in Fig. 1, thereby locking the connecting-rod 70 and lever 68 in position. The lever 68 is provided with an arm 74 having a loop or eye 75, the purpose of which will be hereinafter set forth.

76 indicates a brace connecting arm 74 of the lever 68 with the forwardly-projecting portion of the lever 64, as shown in Fig. 13.

77 indicates a hoisting-drum mounted on the shaft 16 adjacent to the sleeve 55, said drum having a head 78 provided with projecting lugs 79 which are squared on one face and inclined on the opposite face. Said lugs are arranged in annular form and constitute a clutch-member adapted to coöperate with the rollers 58, as shown in Fig. 13. The arrangement is such that when the axle 16 is rotated by the forward movement of the machine and the rollers 58 are in engagement with the lugs 79, the drum 77 will be rotated. The clutch-members may be disconnected by moving the sleeve 55 to the left of the position shown in Fig. 13 so as to disengage the rollers 58 from the lugs 79.

80 indicates a brake-drum mounted loosely on the axle 16 adjacent to the drum 77, said brake-drum having at the end next to the drum 77 an internal annular ratchet-gear 81, as best shown in Fig. 14. The drum 77 is also provided with a head 82 at the end opposite the head 78, the head 82 carrying pawls 83 adapted to coöperate with the ratchet-gear 81 of the drum 80 to prevent the drum 77, which is used for hoisting purposes, from rotating so as to unwind the hoisting cable independently of the brake-drum 80. The hoisting drum 77 may, however, rotate in a forward direction independently of the brake-drum 80. The purpose of this arrangement is to provide for holding the hoisting drum 77 stationary when the clutch-members are disengaged and also to provide for accurately controlling and regulating reverse rotation of the hoisting drum in lowering the elevator-frame. The brake-drum 80 is provided with a brake-band 84 which extends around it, as shown in Figs. 10 and 15, one end of said brake-band being adjustably connected with a fixed support, as by bolts 85 having nuts 86, as shown in Fig. 10, the other end of said band being connected by straps 87, best shown in Fig. 13, with lugs 88 carried by a lever 89 mounted on a pivot 90, as best shown in Fig. 10. The pivot 90 is mounted in a bracket 91 secured to the under side of the cross-bar 36. By rocking the lever 89, the brake-band 84 may be caused to bind tightly upon the brake-drum 80 or may be loosened thereupon, as desired. The lever 89 is connected to and operated by a lever 92 which practically forms an extension of the lever 89 projecting from the rear end thereof, as shown in Fig. 10. Said lever 92 extends down beyond the lever 89 and is then bent so as to project forward therefrom, as shown at 93 in Fig. 10, such forwardly-projecting portion performing a function which will be hereinafter set forth. The lever 92 is connected by a connecting-rod 94 with a lever 95 pivoted intermediately at 96 to the rear portion of the carriage, as shown in Fig. 2, so that by rocking said lever the brake-band may be tightened or released. Preferably, the lever 95 is also connected with the lever 92 below the lever 89 by a second connecting rod 97. The lower end of the lever 95 is bent backward, as shown at 98 in Fig. 2, and is provided with a footrest 99 so that it may be operated by foot power.

100 indicates a spring, one end of which is connected with the upper end portion of the lever 92, its forward end being connected with a lug 101 secured to a suitable stationary support, such as the sleeve 34, as shown in Fig. 13. Thus the spring 100 acts to normally exert forward pull on the lever 92 and consequently keep the brake-band under tension.

102 indicates a spring, the rear end of which is connected with the outer portion of the lever 68, its forward end being connected with a lug 103 secured to a stationary support, such as the sleeve 35, as shown in Fig. 13. The spring 102, therefore, serves to normally swing the outer end of the lever 68 forward and consequently move the rollers 58 into engagement with the lugs 79. The clutch-members may be locked out of engagement, however, by moving the lever 71 into its rearmost position, as shown in Fig. 8, and as hereinbefore described.

104 indicates a truss-rod connecting the sleeves 29—30 and extending under bracket 91, as shown in Fig. 10, for supporting the central portion of the frame.

The parts thus far described relate more particularly to the carriage and the mechanism by which the elevator-frame is actuated or raised to lift the hay into position for discharge upon the stack. I shall now describe the construction of the elevator-frame and the manner in which it is operated.

105 indicates an elevator or carrier frame, which carries, at its forward end, a rake-head 106 and is arranged to swing about a transverse axis to raise and lower said rake-head. As shown in Fig. 5, the elevator-frame comprises side-bars 107—108 which are pivoted at their upper end portions upon the shaft 41 and are connected at their forward end portions by hinges 109 to a cross-bar 110 which extends across and is connected to the teeth 111 of the rake-head, as shown in Fig. 5. Said cross-bar is placed a short distance from the rear ends of the teeth 111 and the forward ends of the side-bars 107—108 extend between the teeth so that the rake-head is free to rock upon its hinges to a considerable extent, as illustrated in Figs. 2 and 3. The rake-head is provided at the rear with an upright-frame 112 which forms a stop for the hay. Said frame carries springs 113, and when the rake-head is in raking position, as shown in Fig. 2, said springs bear upon the side-bars 107—108 and yieldingly hold the points of the rake-teeth upon the ground.

114—115 indicate cross-braces connected to the side-bars 107—108, as shown in Fig. 5.

116 indicates a curved guide or eccentric pulley which is secured to the elevator-frame 105 and serves as a means by which power is transmitted thereto for raising the same. Said pulley, as shown in Fig. 2, comprises a channeled segment, the upper end of which is connected with the side-bars 107—108 by bars 117—118, the rear ends of which are connected to the pulley 116, their forward ends diverging and being connected with the side-bars 107—108, as shown in Fig. 5. The lower or forward end of the pulley 116 is connected with said side-bars by bars 119—120, as also shown in Fig. 5, the lower ends of said bars being braced by braces 121—122. The forward ends of the latter braces are connected with the forward portions of the side-bars 107—108, as shown in Fig. 5.

123 indicates a truss, which is connected with the end portions of the pulley 116 and further reinforces it and supports the same, 124 indicating struts which form a part of said truss. It will be noted from Figs. 1, 2 and 3 that the lower or forward portion of the pulley 116 is at a greater distance from the shaft 41, which forms the pivot or axis of said pulley, than the upper or rear portion thereof, the purpose of which is to secure greater power at the beginning of the lifting operation, when it is most needed, as will be hereinafter explained.

125 indicates a cable, the rear end of which is connected with the upper portion of the pulley 116, as shown at 126 in Fig. 2, the forward end of said cable being connected to the drum 77 upon which it is adapted to be wound, as shown in Figs. 8, 13 and 14.

It will be noted from the foregoing description that by rotating the drum 77 the cable 125 will be wound thereupon, thereby applying power to the pulley 116 to rotate the same, and consequently rocking the elevator-frame about the axis 41. The drum is rotated by the forward movement of the machine when the rollers 58 are in engagement with the lugs 79, as shown in Fig. 13. Consequently, under such conditions, the forward movement of the stacker will operate to raise the elevator-frame, as illustrated in Fig. 3, and owing to the fact that the power is first applied to the pulley 116 at a point farther removed from the axis 41, the power applied will be greatest at the beginning of the lifting movement. In order to prevent the elevator-frame from being raised too high and the damage which would consequently ensue, I provide means for automatically disconnecting the clutch-members which operate the drum 77, when the elevator-frame reaches a predetermined height. For this purpose, the cable 125 is provided with an adjustable button 127, so placed upon it that when the elevator-frame reaches the predetermined height the button 127 will strike the loop 75 of the lever 74 and consequently will move said lever forward. This, as hereinbefore described, will act to move the sleeve 55 to the left of the position shown in Fig. 13 and will consequently disengage the rollers 58 from the lugs 79, thereby stopping the drum 77. The elevator-frame will remain stationary owing to the fact that the brake-drum 80 is held against rotation by the brake-band 84, which is normally held under tension by the spring 100. The loop 75 also serves as a guide for the cable 125, to properly direct it to the pulley 116. When it is desired to lower the elevator-frame, the lever 95 is drawn back, thereby loosening the grip of the brake-band 84 upon the drum 80, when the elevator-frame will descend by its own weight. Owing to the fact that the hoisting drum 77 is connected with the brake-drum 80 by a ratchet connection, as hereinbefore described, it is not necessary to release the brake in order to raise the elevator-frame, and the brake is consequently always ready to sustain the load as soon as the load is applied to it. This is advantageous, as it prevents the elevator-frame from dropping in case the clutch-members should accidentally become disengaged. By employing the clutch mechanism for driving the hoisting drum, it is not necessary to back the machine to lower the elevator-frame, as this is accomplished simply by disconnecting the clutch-members and releasing the brake, the brake being released either by hand power applied to the upper end of the lever 95 or by foot power applied to the footrest 99.

When the machine is used for gathering hay, it is desirable that the points of the teeth 111 bear gently on the ground, as in the position shown in Fig. 2, so that the hay will be taken up by the teeth and will accumulate on the head. When the elevator-frame is raised to elevate the hay, it is, of course, necessary to maintain the rake-head in position to carry its load without spilling it, as illustrated in full lines in Fig. 3, and for this purpose I provide means for automatically maintaining the rake-head in carrying position until the load is transported to the place where it is to be discharged. The mechanism by which this is accomplished is best shown in Figs. 1, 2 and 9. As therein shown, I employ a transverse rod or shaft 128, the ends of which are secured to the braces 42—43, as shown in Fig. 9. Said shaft carries a sleeve 129 provided with a worm-gear 130 near one end and with an eccentric pulley 131 at the other end, the latter being substantially at the transverse center of the machine.

132 indicates a rod, which extends rearwardly from the worm-gear 130 and is provided at its rear end with a hand-wheel 133, conveniently placed to the driver's seat 134. The rear end portion of the rod 132 is supported by a standard 135, as shown in Fig. 1. The rod 132 carries at its forward end a worm 136, shown in Fig. 9, which meshes with the worm-gear 130 so that by rotating the hand-wheel 133 the sleeve 129 may be rotated and with it the pulley 131.

137 indicates a cable which is connected at one end with the pulley 131 and extends over a guide-pulley 138 carried by the bars 117—118, as shown in Figs. 1 and 2, the forward end of said pulley being connected with a V-shaped frame 139 secured to and rising from the rear portion of the rake-head, as best shown in Fig. 3.

140 indicates a guide for the cable 137, said guide being arranged adjacent to the pulley 131 and acting to direct the cable 137 to the groove of said pulley. As best shown in Fig 9, the guide 140 is composed of a rod the ends of which are connected to the braces 48—50, its intermediate portion being bent to form a narrow slot through which the cable 137 passes. By making the pulley 131 eccentric, the cam action thereby secured gives the operator great purchase for lifting the teeth at their points when loaded, and when lowering the teeth for delivering the hay it allows them to drop rapidly at their points so that the hay will slip off quickly and in a bunch. The position of the rake-head when discharging the hay is indicated by dotted lines in Fig. 3. By operating the hand-wheel 133 the operator may, of course, regulate the position of the rake-teeth, as desired, when lifting the load.

For the purpose of depressing the points of the rake-teeth when gathering the hay, the rake-head is provided at the rear with a finger 141, shown in Figs. 1 and 2, which projects over the forward end of the arm 93 of the lever 92 so that when said arm is raised by drawing back the upper end of the lever 95 or depressing the rear end of said lever it will operate to press up on the finger 141 and consequently rock the rake-head upon its hinges so as to depress the points of the teeth.

My improved stacker may be used to gather hay from the swath as left by the mower, from windrows, or for picking up cocks, thus acting as a sweep-rake. In gathering the hay, the points of the teeth are depressed so as to bear gently on the ground. After the rake-head has been loaded, the points of the teeth are raised so as to clear the ground by operating the hand-wheel 113 and thereby tilting the rake-head, and the machine is then driven to the point where the stack is to be built. In approaching the stack, the lever 71 is moved forward to permit the rollers 58 to engage the lugs 79 under the action of the spring 102, whereupon the hoisting drum is driven and the elevator-frame raised to the desired height. When this point is reached, the lever 71 is actuated to release the clutch-members and stop the hoisting-drum, when the load is sustained by the braking mechanism. Upon arriving at the point of discharge, the hand-wheel 133 is operated so that the rake-head may dump its load. The machine is then backed sufficiently to clear the stack and is driven to take up another load. In practice, it is not desirable to use my improved stacker for collecting the hay from remote points, as it is much heavier than a rake, and consequently it is more convenient and better practice to collect the hay from the more distant portions of the field by the use of sweep rakes, leaving the collected hay at convenient points surrounding the place where the stack is to be built. These deposited bunches of hay are then picked up by my improved stacker and carried to and discharged upon the stack, or, if desired, the hay may be deposited upon the stacker-head by means of sweep-rakes, in the manner commonly used in connection with stationary stackers.

An important advantage of my improved construction is that by its use considerable hand labor in building the stack is saved, since the stack can be approached from either side or end and the hay delivered at any point on the stack where it is most required, thus saving the work of moving or pitching the hay by hand, which must necessarily be done where the stationary type of stacker is used, as the latter delivers the hay only at one point on the stack and it must be spread by the men on the stack. With my improved stacker it is, therefore, feasible to build stacks of much greater length than with the stationary type of stacker.

A further advantage is that on windy days the stacker may be driven either directly toward or with the wind so that the hay is scattered less than where it is elevated broadside to the wind. Stationary stackers must be set in a fixed position, and consequently changes in the direction of the wind after the stacker has been set oftentimes very seriously interfere with the work.

By employing the friction brake and ratchet mechanism described, the brake-drum remains stationary while the rake-head is being elevated but holds the load when the clutch is disengaged so that the elevator-frame may be lowered by simply releasing the friction brake, without backing the horses. This may be done either when the machine is being driven or when it is stationary. Therefore, the work upon the horses is greatly lessened and considerable time is saved in the operation of the machine, and consequently a larger amount of hay can be stacked per day than is possible where it is necessary to back the horses or stop the machine for lowering the elevator-frame.

While my improved machine is intended primarily for gathering and stacking hay, it may also be used for handling grain or for any other purpose to which it is adapted, and I wish it to be understood that so far as the elevator-frame and hoisting mechanism are concerned they may be used with other forms of load carriers than a rake-head. In other respects, also, my invention is not restricted to the specific details of the construction shown and described, except in so far as they are particularly claimed, but includes generically the subject-matter of the broader claims.

That which I claim as my invention, and desire to secure by Letters Patent, is,—

1. The combination of a carriage, an elevator-frame pivotally supported thereby to swing in a vertical plane, a rake-head carried by said elevator-frame, hoisting mechanism for raising said elevator-frame, means including clutch mechanism for actuating said hoisting mechanism by the forward movement of the carriage, means for automatically stopping said hoisting mechanism when the elevator-frame is lifted to a predetermined height, brake mechanism normally operating to prevent reverse operation of the hoisting mechanism, and means for releasing the brake to permit the descent of the rake-head.

2. The combination of a carriage, an elevator-frame pivotally supported thereby to swing in a vertical plane, a rake-head carried by said elevator-frame, hoisting mechanism for raising said elevator-frame, means including clutch mechanism for actuating said hoisting mechanism by the forward movement of the carriage, adjustable means for automatically stopping said hoisting mechanism when the elevator-frame is lifted to a predetermined height, brake mechanism normally operating to prevent reverse operation of the hoisting mechanism, and means for releasing the brake to permit the descent of the rake-head.

3. The combination of a carriage, an elevator-frame pivotally supported thereby to swing in a vertical plane, a rake-head carried by said elevator-frame, hoisting mechanism for raising said elevator-frame, means for operating said hoisting mechanism by the forward movement of the carriage, and ratchet-operated brake mechanism normally operating to hold the elevator-frame in its elevated position.

4. The combination of a carriage, an elevator-frame pivotally supported thereby to swing in a vertical plane, a rake-head carried by said elevator-frame, a hoisting-drum, a cable operating on said drum and connected with said elevator-frame for rocking the same, means operated by the forward movement of the carriage for rotating said hoisting-drum, means for disconnecting said drum from said rotating means, a brake-drum, ratchet mechanism connecting said hoisting-drum with said brake-drum, and a braking device normally operating to prevent rotation of said brake-drum.

5. The combination of a carriage, an elevator-frame pivotally supported thereby to swing in a vertical plane, a rake-head carried by said elevator-frame, a hoisting-drum, a cable operating on said drum and connected with said elevator-frame for rocking the same, means operated by the forward movement of the carriage for rotating said hoisting-drum, means for disconnecting said drum from said rotating means, a brake-drum, ratchet mechanism connecting said hoisting-drum with said brake-drum, a brake-band engaging said brake-drum, and a spring for operating said brake-band to cause it to normally clamp said brake-drum.

6. The combination of a carriage, an elevator-frame pivotally supported thereby to swing in a vertical plane, a rake-head carried by said elevator-frame, a hoisting-drum having a clutch-member, a rotary shaft operated by the forward movement of the carriage, said shaft having a clutch-member adapted to engage said first-mentioned clutch-member, a lever for operating one of said clutch-members, means for automatically disconnecting said clutch-members when the elevator-frame reaches a predetermined height, a brake-drum having a braking device normally operating to prevent rotation of said drum, and means operatively connecting said hoisting and brake drums when the hoisting-drum is rotated to lower the elevator-frame.

7. The combination of a carriage, an elevator-frame pivotally supported thereby to swing in a vertical plane, a rake-head carried by said elevator-frame, a hoisting-drum having a clutch-member, a rotary shaft operated by the forward movement of the carriage, said shaft having a clutch-member adapted to engage said first-mentioned clutch-member, a lever for operating one of said clutch-members, means for automatically disconnecting said clutch-members when the elevator-frame reaches a predetermined height, a brake-drum having a braking device normally operating to prevent rotation of said drum, and ratchet mechanism operated by reverse movement of the hoisting-drum for connecting the same with said brake-drum.

8. The combination of a carriage having a rotary front axle, wheels mounted on said axle, a hoisting-drum loosely mounted on said axle, a brake-drum loosely mounted on said axle, a ratchet connection between said hoisting-drum and said brake-drum, a braking device coöperating with said brake-drum, an elevator-frame pivotally supported by said carriage to rock in a vertical plane, a rake-head carried by said elevator-frame a cable connecting said elevator-frame with said hoisting-drum, and means for rotating said hoisting-drum by the forward movement of the carriage.

9. The combination of a carriage having a rotary front axle, wheels mounted on said axle, a hoisting-drum loosely mounted on said axle, a brake-drum loosely mounted on said axle, a ratchet connection between said hoisting-drum and said brake-drum, a braking device coöperating with said brake-drum, an elevator-frame pivotally supported by said carriage to rock in a vertical plane, a rake-head carried by said elevator-frame a cable connecting said elevator-frame with said hoisting-drum, and means for operatively connecting the hoisting-drum with the front axle.

10. The combination of a carriage having a rotary front axle, wheels mounted on said axle, a hoisting-drum loosely mounted on said axle, a brake-drum loosely mounted on said axle, a ratchet connection between said hoisting-drum and said brake-drum, a braking device coöperating with said brake-drum, an elevator-frame pivotally supported by said carriage to rock in a vertical plane, a rake-head carried by said elevator-frame a cable connecting said elevator-frame with said hoisting-drum, means for operatively connecting the hoisting-drum with the front axle, and means for automatically disconnecting said hoisting-drum with the front axle when the elevator-frame reaches a predetermined height.

11. The combination of a carriage having a rotary front axle, wheels mounted on said axle, a hoisting-drum loosely mounted on said axle, a brake-drum loosely mounted on said axle, a ratchet connection between said hoisting-drum and said brake-drum, a braking device coöperating with said brake-drum, an elevator-frame pivotally supported by said carriage to rock in a vertical plane, a rake-head carried by said elevator-frame a cable connecting said elevator-frame with said hoisting-drum, means for operatively connecting the hoisting-drum with the front axle, and adjustable means for automatically disconnecting said hoisting-drum with the front axle when the elevator-frame reaches a predetermined height.

12. The combination of a carriage, a hoisting-drum operated by the forward movement of the carriage, an elevator-frame pivotally mounted on the carriage to rock in a vertical plane, a rake-head carried by said elevator-frame said elevator-frame having an eccentric pulley, and a cable connected with the hoisting-drum and operating on said pulley for rocking the elevator-frame.

13. The combination of a carriage, an elevator-frame pivotally mounted on the carriage to rock in a vertical plane, a rake-head carried by said elevator-frame and hoisting mechanism operated by the forward movement of the carriage for rocking said elevator-frame, said hoisting mechanism comprising means for applying greater power to the elevator-frame at the beginning of the lifting movement.

14. A portable hay-stacker, comprising a carriage, an elevator-frame pivotally supported thereon to rock in a vertical plane, a rake-head carried by said elevator-frame, means operated by the forward movement of the carriage for elevating said elevator-frame, and means for adjusting the position of said rake-head with reference to the elevator-frame comprising an eccentric pulley, means for rotating said pulley, and a cable operating on said pulley and connected with said rake-head.

15. A portable hay-stacker, comprising a carriage, an elevator-frame pivotally supported thereon to rock in a vertical plane, a rake-head carried by said elevator-frame, means operated by the forward movement of the carriage for elevating said elevator-frame, and means for adjusting the position of said rake-head with reference to the elevator-frame comprising a pulley, means for rotating said pulley, a cable operating on said pulley and connected with said rake-head, and a Y-shaped slotted guide adjacent to the pulley for guiding the cable as it is wound on the pulley.

16. A portable hay-stacker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, and a spring for yieldingly holding the points of the rake-teeth on the ground when the rake-head is in raking position.

17. A portable hay-raker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, and a spring between the rake-head and said elevator-frame for yieldingly holding the points of the rake-teeth on the ground when the rake-head is in raking position.

18. A portable hay-stacker, comprising a carriage, an elevator-frame pivotally supported thereon to rock in a vertical plane, a rake-head carried by said elevator-frame, means operated by the forward movement of the carriage for elevating said elevator-frame, and means for applying downward pressure to the points of the rake-teeth when the rake-head is in raking position.

19. A portable hay-stacker, comprising a carriage, an elevator-frame pivotally supported thereon to rock in a vertical plane, a rake-head carried by said elevator-frame, means operated by the forward movement of the carriage for elevating said elevator-frame, and a lever for applying downward pressure to the points of the rake-teeth when the rake-head is in raking position.

20. A portable hay-stacker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, ratchet-operated brake mechanism for holding the elevator-frame in an elevated position, and a lever for releasing said brake mechanism and for applying downward pressure to the points of the rake-teeth.

21. A portable hay-stacker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, brake mechanism for holding the elevator-frame in an elevated position, a lever for releasing said brake mechanism and for applying downward pressure to the points of the rake-teeth when in raking position, and means for cushioning the rake-teeth.

22. A portable hay-stacker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, brake mechanism for holding the elevator-frame in an elevated position, and combined hand and foot lever mechanism for releasing said brake mechanism and for applying downward pressure to the points of the rake-teeth.

23. A portable hay-stacker, comprising a carriage, an elevator-frame pivotally supported thereon to rock in a vertical plane, a rake-head carried by said elevator-frame, means operated by the forward movement of the carriage for elevating said elevator-frame, means for adjusting the position of said rake-head with reference to the elevator-frame, brake mechanism for holding the elevator-frame in an elevated position, combined hand and foot lever mechanism for releasing said brake mechanism and for applying downward pressure to the points of the rake-teeth when in raking position, and a spring for holding the points of the rake-teeth on the ground when the rake-head is in operative position.

24. The combination of a carriage, a hoisting-drum operated by the forward movement of the carriage, an elevator-frame mounted on the carriage to rock in a vertical plane, a rake-head carried by said elevator-frame, a segmental pulley connected with said elevator-frame and pivoted eccentrically, a hoisting-rope operating on said pulley and hoisting-drum for elevating the rake-head by the forward movement of the carriage, said hoisting mechanism being arranged to apply the greatest power to said pulley at the beginning of the lifting movement.

25. The combination of a carriage, a hoisting-drum operated by the forward movement thereof, an elevator-frame pivotally mounted on the carriage to rock in a vertical plane, a rake-head carried by said elevator-frame, a segmental guide having its end portions connected with the elevator-frame, said guide being disposed eccentrically with reference to the pivot of said elevator-frame, and a cable operating on said guide and hoisting-drum for raising the elevator-frame.

26. A portable hay-stacker, comprising a carriage, an elevator-frame pivotally supported thereon to rock in a vertical plane, a rake-head carried by said elevator-frame, a hoisting-drum operated by the forward movement of the carriage, a cable operating on said drum and connected with the elevator-frame for raising the same, a brake-drum, ratchet mechanism connecting said brake-drum with said hoisting-drum and operating on reverse movement only of the hoisting-drum, and a brake-band normally operatively engaging said brake-drum.

JOSEPH DAIN.

Witnesses:
Joseph Browning,
W. G. Duwield.

Copies of this patent may be obtained for five cents each, by addressing the "Commissioner of Patents, Washington, D. C."